United States Patent
Shade et al.

(10) Patent No.: US 7,171,981 B2
(45) Date of Patent: Feb. 6, 2007

(54) FLOW CONTROL DEVICE AND SYSTEM

(75) Inventors: Stephen Shade, Mesa, AZ (US); James Starace, Gilbert, AZ (US)

(73) Assignee: Watersav Enterprises, LLC, Gilbert, AZ (US)

(*) Notice: Subject to any disclaimer, the term of this patent is extended or adjusted under 35 U.S.C. 154(b) by 0 days.

(21) Appl. No.: 10/884,846

(22) Filed: Jul. 2, 2004

(65) Prior Publication Data

US 2006/0000511 A1    Jan. 5, 2006

(51) Int. Cl.
*F16K 15/04* (2006.01)
(52) U.S. Cl. .............. 137/533.11; 137/375; 137/454.5; 137/515.5; 137/519.5; 251/65; 251/367
(58) Field of Classification Search ............ 137/519.5, 137/515.5, 522, 523, 375, 454.2, 454.5, 460, 137/498, 533.11, 533.13; 251/65, 367, 368
See application file for complete search history.

(56) References Cited

U.S. PATENT DOCUMENTS

| | | | | |
|---|---|---|---|---|
| 398,111 | A | * | 2/1889 | Abbot et al. .................. 137/515 |
| 1,244,689 | A | * | 10/1917 | Bell ........................ 137/516.25 |
| 1,786,963 | A | * | 12/1930 | Schoenberger .............. 137/883 |
| 3,534,767 | A | * | 10/1970 | Swinney ...................... 137/375 |
| 4,224,961 | A | * | 9/1980 | Schnabel ..................... 137/375 |
| 4,349,042 | A | * | 9/1982 | Shimizu ....................... 137/39 |
| 4,606,953 | A | * | 8/1986 | Suzuki et al. ................ 138/143 |
| 4,825,897 | A | | 5/1989 | Shade |
| 4,944,327 | A | | 7/1990 | Gyben |
| 5,052,429 | A | * | 10/1991 | Yoo ............................. 137/38 |
| 5,069,239 | A | * | 12/1991 | Bunce et al. ............. 137/15.04 |
| 5,086,976 | A | | 2/1992 | Sessions |
| 5,174,500 | A | | 12/1992 | Yianilos |
| 5,335,857 | A | | 8/1994 | Hagon |
| 5,465,752 | A | | 11/1995 | Higgins |
| 5,524,824 | A | | 6/1996 | Frimmer |
| 5,704,391 | A | | 1/1998 | McGowan, Jr. et al. |
| 5,857,487 | A | | 1/1999 | Carson et al. |
| 6,000,632 | A | | 12/1999 | Wallace |
| 6,062,247 | A | | 5/2000 | King, Sr. |
| 6,179,221 | B1 | | 1/2001 | Goldberg et al. |
| 6,199,584 | B1 | | 3/2001 | Brown et al. |
| 6,202,678 | B1 | | 3/2001 | Hawkins |
| 6,263,912 | B1 | | 7/2001 | Brown et al. |
| 6,719,003 | B2 | * | 4/2004 | Schroeder et al. .......... 137/322 |

OTHER PUBLICATIONS

Toro Create A Greater Outdoors, "Toro 570Z PRX Series Spray Sprinklers", May 19, 2004 pp. 1 & 2.

* cited by examiner

*Primary Examiner*—Ramesh Krishnamurthy
(74) *Attorney, Agent, or Firm*—Schmeiser, Olsen & Watts LLP

(57) ABSTRACT

A flow control valve has a ball and an annular seat providing a positive stop for automatically preventing flow through the valve when a line downstream has been broken. The flow control valve is useful for interior applications in which seepage through the valve would be unacceptable and in which both hot and cold water lines need to be protected. A magnet may aid in positioning the ball. Sensors may be used to detect positions of the ball. A flow control system that includes the flow control valve may include any of a variety of interchangeable components for facilitating incorporation of the flow control valve in a water or other fluid line. Another embodiment includes a mechanism for detecting and stopping flow due to slow leaks.

14 Claims, 6 Drawing Sheets

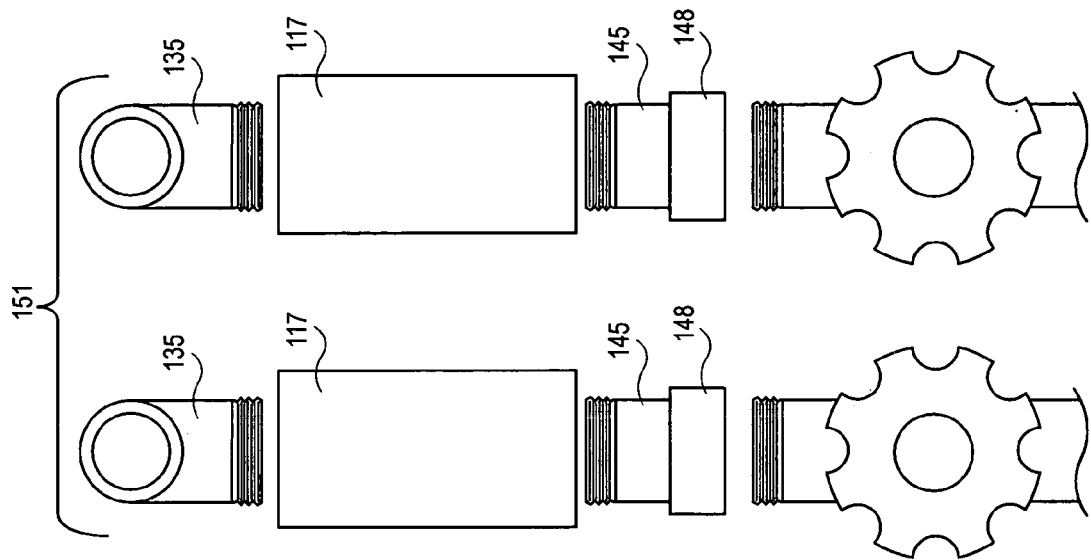
FIG. 2D
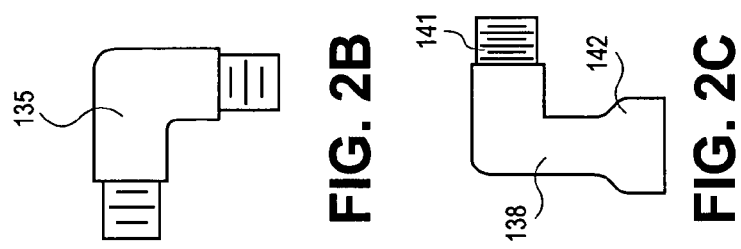
FIG. 2B
FIG. 2C
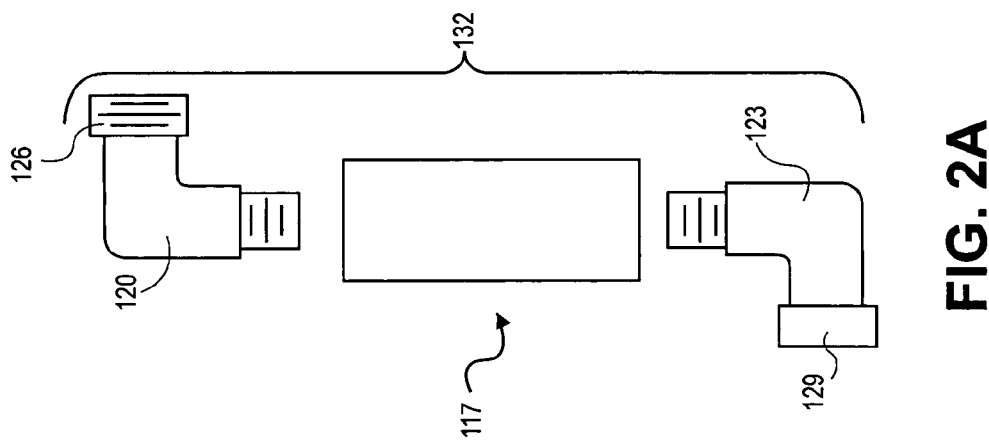
FIG. 2A

FLOW CONTROL DEVICE AND SYSTEM

BACKGROUND OF THE INVENTION

1. Technical Field

This invention generally relates to flow control valves in general, and more specifically to automatic shutoff valves for preventing waste and water damage in case of a leak or breakage of a line downstream.

2. State of the Art

Many attempts have been made to provide protection against water damage and waste due to breakage of lines. The results include many complex devices that are typically applied to specific applications. Many of these devices are in the irrigation and sprinkler systems arts. However, few if any have found ways in which to improve on Applicant's own invention as disclosed in his prior U.S. Pat. No. 4,825,897, while maintaining a high level of simplicity.

DISCLOSURE OF THE INVENTION

The present invention relates to flow control valves in general, and more specifically to automatic shutoff valves for preventing waste and water damage in case of a leak or breakage of a line downstream. In particular, the present invention relates to and is considered to be an improvement upon Applicant's own invention as disclosed in his U.S. Pat. No. 4,825,897, issued May 2, 1989 to Stephen A. Shade, and entitled "FLOW CONTROL VALVE", which is incorporated herein by reference.

A flow control valve in accordance with the present invention may include a ball and annular seat providing a positive stop for automatically preventing flow through the valve when a line downstream has been broken. The flow control valve is useful for interior applications in which seepage through the valve would be unacceptable and in which both hot and cold water lines need to be protected. A magnet may aid in positioning the ball. Sensors may be used to detect positions of the ball. A flow control system that includes the flow control valve may include any of a variety of interchangeable components for facilitating incorporation of the flow control valve in a water or other fluid line. The invention may include a mechanism for detecting and stopping flow due to slow leaks.

In a simple form, the present invention may include a flow control valve. The flow control valve may include a valve housing having a valve chamber. The valve chamber may have a channel with a first inner diameter. The valve housing may including first and second restrictive ends of the valve chamber. The first and second restrictive ends may form first and second valve seats. The restrictive ends may be formed by openings having restrictive dimensions at opposite downstream and upstream positions of the chamber, respectively. A ball may be held in the valve chamber by the first and second restrictive ends. To this end, the ball may have a second diameter substantially smaller than the first diameter and larger than the restrictive dimensions. The downstream restrictive end may include an annular valve seat at the first end. The valve housing may include at least two parts. The seam may form a connection between the at least two parts of the valve housing with a seam at one of the first and second ends of the housing. The seam may be located at an intersection between one of the parts having the first diameter and the other of the parts forming one of the restrictive ends of the valve chamber.

In a flow control valve of the present invention, one of the parts may be a valve seat fitting that is slidably received into the other of the parts. The valve seat fitting may include integral male threads. Alternatively, the valve seat fitting may include integral female threads. Further alternatively or additionally, the valve seat fitting may include an elbow.

In a flow control valve of the present invention, the housing may have a magnet adjustably supported thereon. One or more sensors may be operatively connected to the housing for detecting a position of the ball within the valve chamber. The flow control valve may include a restriction fluidly connected to an interior of the valve.

In a flow control valve of the present invention, the valve housing may include structure that forms the valve chamber as a circuitous loop. In this case, the flow control valve further may include a sleeve of flexible material disposed at least partially within the housing.

A flow control valve in accordance with the present invention may include a valve chamber having a longitudinal axis adapted to be oriented vertically in a direction of flow. The valve chamber may have a first inner diameter. A ball may have a second diameter substantially smaller than the first diameter. First and second spherically configured valve seats may be disposed at first and second ends of said chamber, respectively. At least one of the ball and the seats may include a flexible material that forms a complete seal when the valve is closed. The flexible material may remain flexible at all temperatures in a range from approximately thirty-two degrees F. to approximately two hundred twelve degrees F.

In a flow control valve, the ball may have a core that includes one or more of a brass, a stainless steel, glass, and a nickel material. The ball may have a layer or coating that includes one or more of a polyurethane, a carbon, a ceramic, and a Teflon material. Alternatively, the core may have no additional layer or coating. The ball may have a size of approximately ½ inch to approximately 3 inches. The valves may be formed with variety of configurations and/or sizes so that the balls may be provided in quarter inch increments, for example. In one case, the ball may have a size of approximately ½ inch. In the flow control valve of the present invention, the ball may have a size of approximately ¾ inch. Alternatively, the ball may have a size of approximately 1 inch. Other sizes may also be provided including those between quarter inch increments.

In a flow control valve of the present invention, the seat may include one of PVC, ABS, copper, brass, and stainless steel. The ball may have a density that causes it to substantially remain suspended in water during normal flow conditions. The valve chamber may be a first valve chamber. The flow control valve may further include an automatic shutoff valve having at least the first valve chamber and a second valve chamber. In the flow control valve of the present invention, the automatic shutoff valve may be a single integral unit that includes the first and second valve chambers.

In another simple form, the present invention may include a flow control valve kit for installation in walls, cabinets, or other applications. The kit may include a housing having at least one inlet opening, at least one outlet opening, and mounting structure for connection of the housing to walls or cabinets. At least one automatic shutoff valve for connecting a line entering the inlet opening to a line exiting the outlet opening. The automatic shutoff valve may be connected to the housing and may include a valve chamber having a first inner diameter, a ball having a second diameter substantially smaller than the first diameter, and first and second annularly configured valve seats at first and second ends of said chamber, respectively.

The inlet opening may be a first inlet opening. The outlet opening may be a first outlet opening. The valve chamber may be a first valve chamber. The housing further include a plurality of inlet openings including the first inlet opening. The housing may also include plurality of outlet openings including the first outlet opening. The automatic shutoff valve may be an integral unit and may further include a plurality of valve chambers including the first valve chamber.

In a flow control valve kit, the housing and the automatic shutoff valve may be configured as a single integral unit. At least one of the ball and the seats may include a flexible material that forms a complete seal when the valve is closed. The flexible material has characteristics such that the material remains flexible at all temperatures in a range from approximately 32 degrees F. to approximately 212 degrees F.

An automatic shutoff valve in accordance with the present invention may include a plurality of valve chambers having inner diameters of a first dimension, a plurality of balls having diameters of a second dimension substantially smaller than the first dimension, and an annularly configured valve seat at each end of each of the valve chambers. The automatic shutoff valve may be formed integrally with a housing. The housing may form an enclosure surrounding the valve chambers and an outlet. The housing may form an inlet through a wall of the enclosure. At least one of the balls and the seats may include a flexible material that forms a complete seal when the valve is closed.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 2A is an exploded view of a flow control valve system of the present invention with upstream and downstream elbows;

FIG. 2B is a side view of an alternative elbow usable together with the present invention;

FIG. 2C is a side view of a further alternative elbow usable with the flow control valve of the present invention;

FIG. 2D is an exploded front plan view of another flow control system including a pair of flow control valves, respective fittings for the control valves, and a water supply for each of the flow control valves;

DETAILED DESCRIPTION OF EMBODIMENTS OF THE INVENTION

Figure 1A:
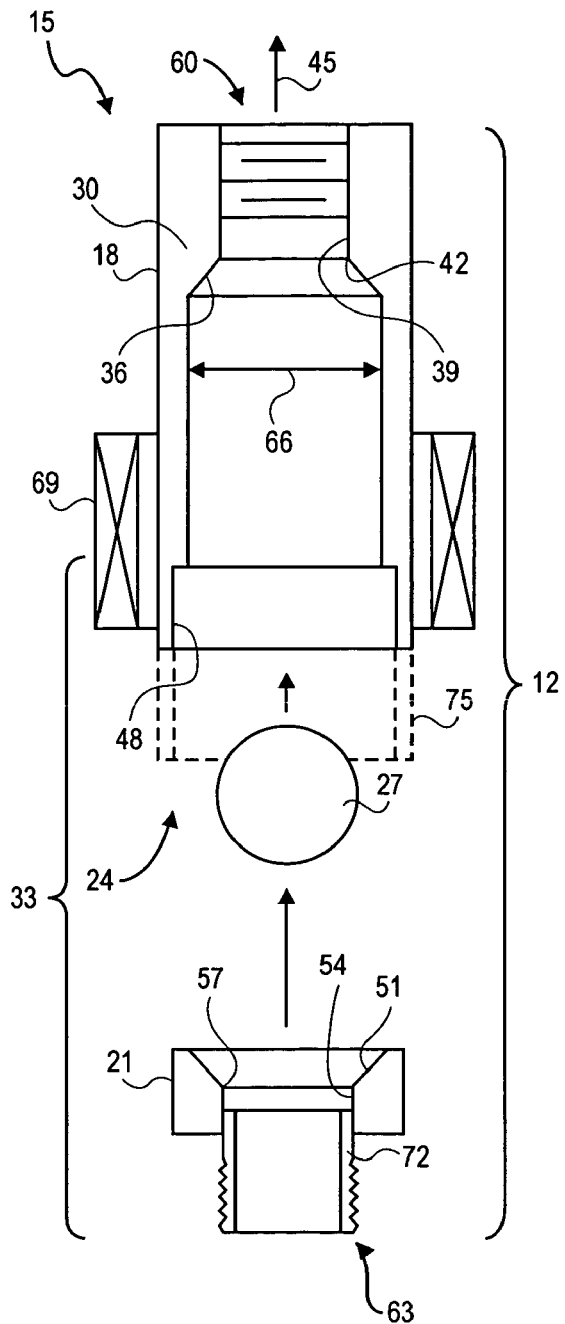
FIG. 1A is an exploded sectional view of a flow control valve in accordance with the present invention.

FIG. 1A is an exploded sectional view of a flow control valve 12 in accordance with one embodiment of the present invention. The flow control valve 12 may include a housing 15 having a first piece 18 and a second piece 21 that may be joined together to form a valve chamber 24 within the housing 15. A ball 27 may be enclosed in the chamber 24 between a first end 30 and a second end 33 of the housing 15. A first end wall 36 of the chamber 24 may have an opening 39 of a diameter smaller than the diameter of the ball 27. Thus, the end wall 36 forms a restriction that prevents the ball 27 from passing out of the chamber 24 through the first end 30 of the housing 15. A transition between the end wall 36 and the opening 39 forms an annular valve seat 42. Thus, under conditions of high flow, the ball 27 will be caused to engage the seat 42 to positively and completely seal the chamber 24 against flow of fluid therethrough in a direction of flow 45.

As shown in FIG. 1A, in order to form the chamber 24, the second piece 21 may be inserted into an opening 48 thus forming the second end 33 of the housing 15. The second piece 21 may be permanently connected to the first piece 18 by any of a variety of mechanisms and including, by way of example and not be way of limitation, adhesive bonding, soldering, welding, and interference fitting. In a connected condition the second piece 21 may enclose the ball 27 in the chamber 24. The second piece 21 may have an end wall 51 that provides a restriction for blocking passage of the ball 27 out of the chamber 24 in a direction opposite to a regular direction of flow 45. This restriction may be provided by structure forming an opening 54 through the end wall 51 of the second piece 21. The opening 54 may have a diameter smaller than the diameter of the ball 27. A transition between the end wall 51 and the opening 54 provides a second valve seat 57. The valve seat 57 is an annular valve seat that may positively and completely seal against a surface of the ball 27 under the weight of the ball 27. Such sealing may occur when the flow control valve 12 is oriented to extend longitudinally in a vertical direction, and when flow of fluid in the normal direction 45 has been stopped by a valve upstream, for example. This arrangement provides the advantage of sealing the flow control valve 12 against back flow once flow from a source has been shut off, for example.

As may be appreciated, the flow control valve 12 may be placed in a fluid flow line such as a water line, for example. The first end 30 of the flow control valve 12 may have a first outlet connection 60 for connection to a downstream portion of the line. The second piece 21 may include an inlet connection 63 for connection with an upstream portion of the line. Thus, if an element in the downstream portion of the line breaks resulting in highly unrestricted flow, the flow will carry the ball 27 into sealing engagement with the first valve seat 42. However, under normal flow conditions, there is some flow restriction downstream that results in an intermediate flow rate. At this intermediate flow rate, the ball 27 will be suspended in the chamber 24 somewhere between the first end wall 36 and the second end wall 51. The fluid in the line is permitted to flow around the sides of the ball 27 and downstream under these conditions. This suspension of the ball 27 and flow around the sides thereof are made possible by providing the valve chamber 24 of a predetermined diameter 66 in relation to the diameter of the ball 27. Furthermore, orientation of the flow control valve 12 in a longitudinally vertical orientation enables the ball 27 to fall into engagement with the second valve seat 57 under the influence of gravity when flow of the fluid in the system has been shut off. The proper balance of causing the ball 27 to shut off flow under a broken line condition, causing the ball 27 to be suspended in the valve chamber 24 under normal flow conditions, and enabling the ball 27 to fall into engagement with the valve seat 57 when the fluid flow has been shut off is also a function of the weight and size of the ball 27. The weight and size of the ball 27 may also be described in terms of buoyancy. In particular, the weights of the ball may be varied as described in applicants own U.S. Pat. No. 4,825,897, which is incorporated herein by reference.

As shown in FIG. 1A, a magnet 69 may be additionally or alternatively provided in a surrounding relationship to the housing 15 in a position that is spaced from the first end 30. By providing the ball 27 of materials including a magnetically attractive metal, the magnet 69 may advantageously attract the ball 27 to urge the ball 27 away from the first valve seat 42. The proximity of the magnet 69 and its strength may be adjusted to cause a predetermined force on the ball 27. As may be appreciated, this ball and magnet configuration may enable use of the flow control valve 12 in orientations other than the longitudinally vertical orientation described above. That is, the magnet 69 may be used to advantageously hold the ball 27 away from the first seat 42 under normal flow conditions. On the other hand, if a line breaks at the outlet connection 60 or downstream therefrom, a flow exceeding a predetermined maximum threshold will thereby carry the ball 27 into sealing contact with the first valve seat 42.

Figure 1B:
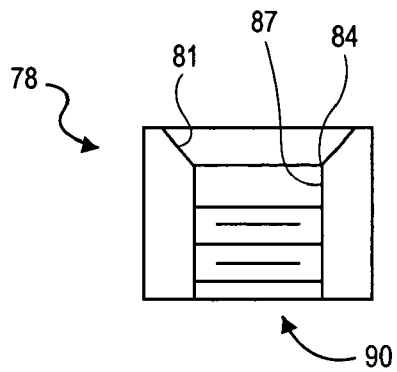
FIG. 1B is a sectional view of an alternative end piece fitting usable together with the present invention.

As shown in FIG. 1A, the second piece may include a male nipple that may be engaged in the opening 54. On the other hand, a large variety of alternative connections are available for both of the inlet and outlet connections. For example, the walls of the housing 15 may have an extended portion 75 that also extends the opening 48 on an interior thereof for receiving substantially all of an alternative second piece 78 shown in FIG. 1B. The alternatively end piece 78 may be received in the opening 48 to provide an alternative end wall 81, second valve seat 84, opening 87, and inlet connection 90. As may be appreciated, the alternative second piece 78 may provide the inlet connection 90 as a female connection, as shown in FIG. 1B. The alternative second piece 78 may be permanently connected to the first piece 18 of the housing 15 shown in FIG. 1A. In any case, it is to be understood that the housing may be rotated 180 degrees for flow in an opposite direction through the chamber 24, (toward the second piece 21 or 78), without departing from the spirit and scope of the invention.

On the other hand, FIG. 1A shows an advantageous configuration and orientation in which the second piece 21 may be located at an upstream end of the housing 15. Because of the structural characteristics and the male configuration of the second piece 21, greater strength is provided in the portion of line that includes the second piece 21. Thus, by comparison, the portion of the line including downstream end 30 of the housing 15 will be weaker and more prone to breakage when an external force is applied to the system. As such, a line will tend to break downstream of the flow control valve 12 and the resulting leak will be contained by the valve 12 when an excessive force or impact causes such breakage. The male second piece 21 also has the advantage of being shorter as viewed in FIG. 1A than would the second piece 78, for example. Thus, for installations calling for a lower profile flow control valve, the male second piece 21 may be advantageously used. Male fittings may be further advantageously incorporated in other combinations, as will be described below.

Figure 1C:
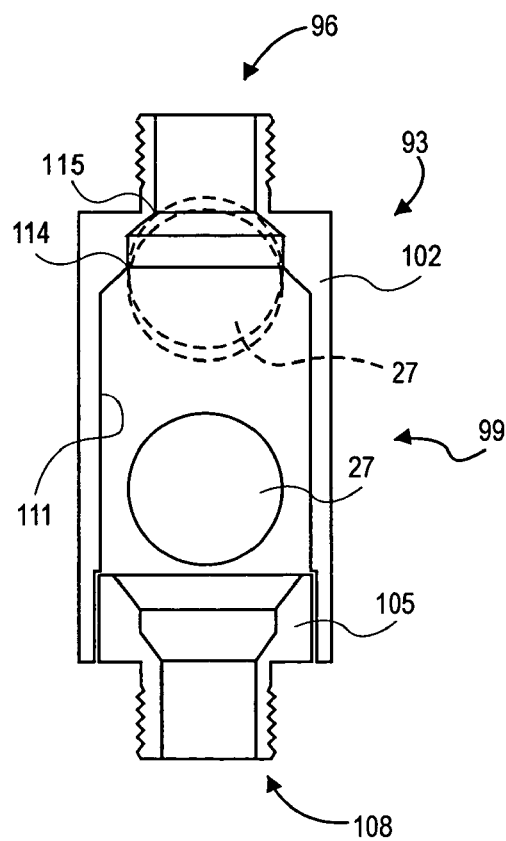
FIG. 1C is a sectional view of a flow control valve having an integral male fitting.

FIG. 1C has a flow control valve 93 similar to those shown in FIGS. 1A and 1B. However, the flow control valve 93 of FIG. 1C has an outlet connection 96 in the form of a male connection. A housing 99 may include a first piece 102 and a second piece 105 that are generally analogous to the first and second pieces 18 and 21 in FIG. 1A. However, the second piece 105 of FIG. 1C includes an inlet connection 108 that has an integral male connection. Otherwise, the flow control valve 93 of FIG. 1C may function substantially similarly to those shown and described with regard to FIGS. 1A and 1B above. For example, the ball 27 will float in a chamber 111 of the flow control valve 93 under normal flow conditions. When a line downstream is broken, the ball 27 will be moved into engagement with a valve seat 114 similarly to that described above. Further advantageously, the ball 27 may be replaced by a ball sized to engage the valve seat 114 and a second valve seat 115 for a double seal configuration as shown by the second circular dashed line representing the ball. Similar valve seats may be provided in the second piece 105 for such sealing in both directions. It is to be understood that a magnet such as magnet 69 could be implemented together with the flow control valve 93 of FIG. 1C. Furthermore, it is to be understood that the alternative second piece 78 of FIG. 1B, or the second piece 21 of FIG. 1A, could be used in place of the second piece 105.

FIG. 2A shows a flow control valve 117 having both inlet and outlet connections of a female type. Furthermore, a first elbow adapter 120 or a second elbow adapter 123 may be selectively connected to the inlet and outlet connections as desired. As shown, the first elbow adapter 120 may have male threads 126 on a downstream end thereof. The second elbow adapter 123, on the other hand, may have a female coupler 129 on an upstream end thereof. The flow control valve 117, and the adapters 120 and 123 may be supplied together as a system or kit 132, for example. Any of the various flow control valves may be provided together with any number and configuration, or variety of configurations, of adapters and second pieces in order to provide kits having a high degree of versatility for retrofitting or use in initial installations, for example.

FIG. 2B is a side plan view of a further alternative adapter 135 in the form of an elbow having two male ends. Such an adapter may be advantageously used in some applications.

FIG. 2C is a side plan view of an adapter 138. The adapter 138 of FIG. 2C may include a male fitting 141 on a first end thereof, and the second end 142 similar to the second pieces 21/78/105 shown and described in FIG. 1A–1C, for example. Thus, the adapter 138 may be a combination elbow and second piece adapter.

FIG. 2D shows a pair of flow control valves 117 similar to the flow control valve 117 of FIG. 2A. In this exemplary embodiment, the flow control valves 117 may be provided together with adapters 135 on downstream ends and adapters 145 with couplers 148 on upstream ends. This combination of elements may be provided together as a system or kit 151, which may be used for an initial installation of the pair of flow control valves 117 on a hot and cold water supply for a washing machine, for example. Thus, protection against waste and water damage can be provided in an interior application. As may be appreciated, the adapters 145 may be replaced by the adapters 123 shown in FIG. 2A for retrofit or other applications in which the hot and/or cold water supply outlets are oriented in a horizontal direction, for example.

Figure 2E:
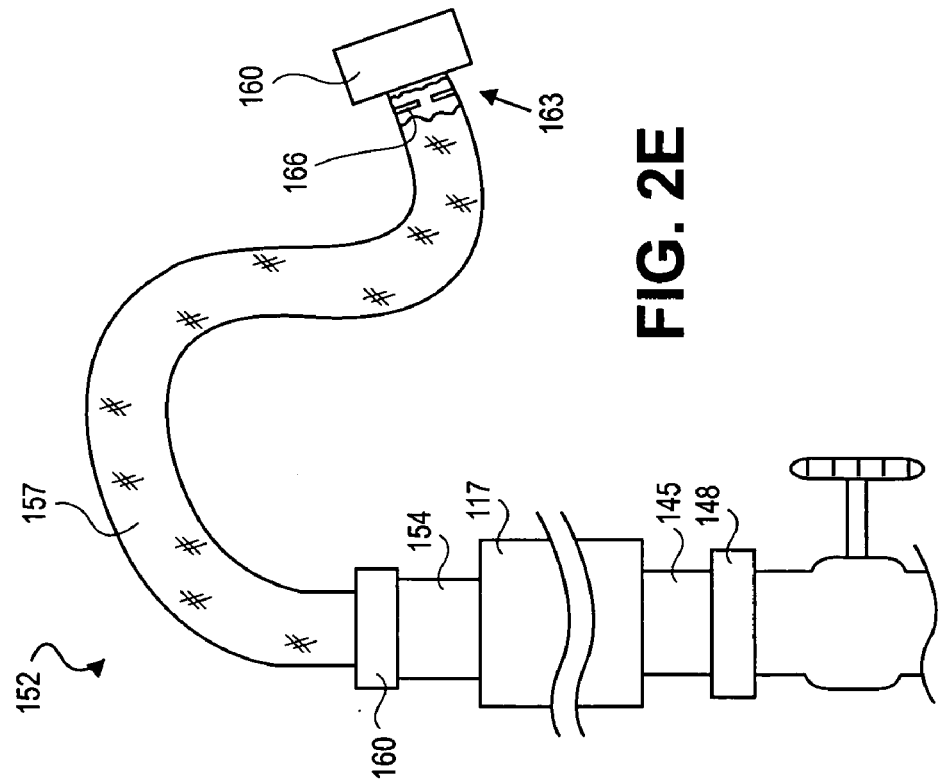
FIG. 2E is a side plan view of a flow control system including a flow control valve connected to a water supply upstream and a flexible hose downstream.

As shown in FIG. 2E, a flow control system 152 may include the flow control valve 117 with a first adapter 145 upstream and a nipple adapter 154 connecting the outlet connection of the flow control valve 117 with a flexible hose 157 that may have female couplers 160 at each of the upstream and downstream ends thereof. As may be appreciated, this flexible hose 157 may be similar to those that are currently used in conjunction with washing machines. However, it is to be understood that such hoses 157 could be advantageously included in kits together with a variety of other components as has been described above. Furthermore, as shown in a partial sectional view at a cutaway region 163 at a downstream end of the flexible hose 157, a restriction may be provided by an apertured wall 166, for example. Such a restriction could be provided in a flexible hose 157 or in the adapters that have been described above. The advantageous function of providing such a restriction is that doing so may limit flow through the particular line to which the restriction is applied in a manner to assure flow rates in a predetermined range in which the flow control valve is made to function. It is to be understood that a system or kit could be provided with a variety of restriction options to enable adjustment of flow for particular applications and source pressures, for example.

While several of the fittings in FIGS. 1A–2E are shown and described as including threads, it is to be understood that any of the threaded connection may be replaced by smooth fittings that may be soldered or glued. Furthermore, the smooth fittings may be replaced by threaded fittings.

Figure 3:
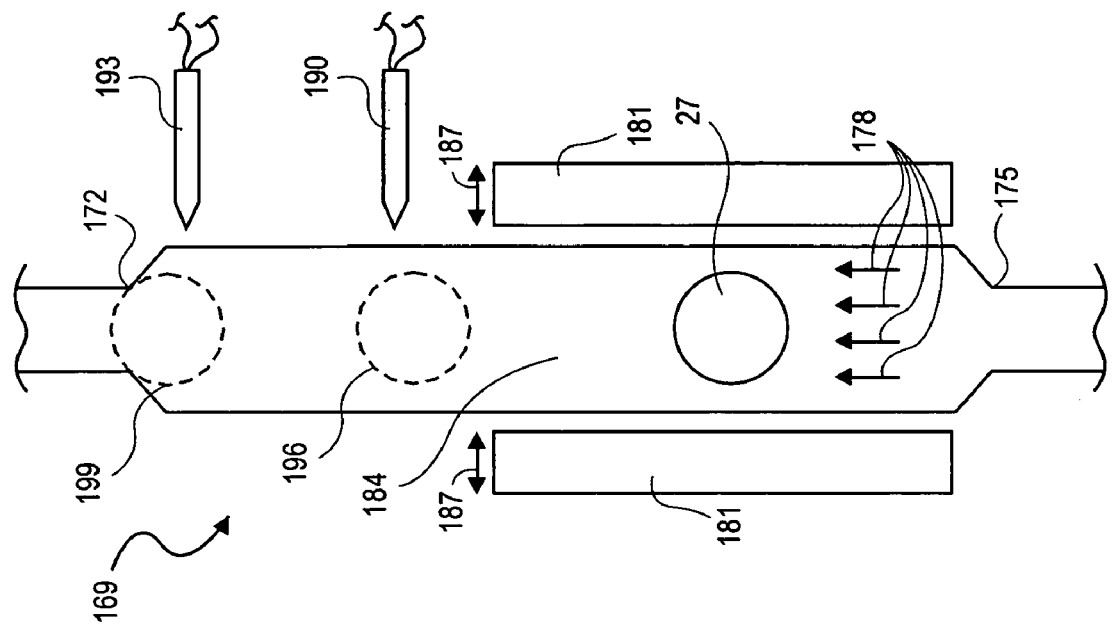
FIG. 3 is a diagrammatic sectional view of a flow control valve and showing special features that may be incorporated with the flow control valve.

FIG. 3 is a diagrammatic sectional view of a flow control valve 169 showing features that may be incorporated with any or all of the embodiments of the present invention. As shown, the flow control valve 169 may include a first valve seat 172 and a second valve seat 175 similar to those shown and described with regard to FIGS. 1A through 2E above. It is to be understood that the flow control valve 169 may be provided by housings that are formed similarly to those shown in FIGS. 1A–2E. A flow of fluid, such as water, may be provided in a direction of regular flow indicated by the arrows 178. A magnetic element 181 may be provided as a single angular element or as a plurality of magnets generally surrounding a chamber 184 of the flow control valve 169. As indicated by the arrows 187, the magnetic element(s) 181 may be moved closer to or away from the valve chamber 184. With the ball 27 including magnetically attractive materials, the magnetic element(s) 181 may advantageously be used to hold the ball 27 in a suspended condition with greater than usual rates of flow. Alternatively or additionally, the magnet element(s) 181 may be used to maintain the ball 27 in a region of the chamber 184 when the flow control valve 169 is not longitudinally oriented in a vertical position. As such, the flow control valve 169 may or may not be oriented in a longitudinally vertical position. Even though FIG. 3 is diagrammatic, it is to be understood that the inlet and outlet lines may have straight ends for advantageously providing a solderable connection. Such a connection has the advantage of providing an easy retrofit application to existing copper pipes, for example.

One or more sensors 190, 193 may be positioned along the chamber 184 for detecting a position of the ball 27. For example, when the ball 27 leaves a region that is surrounded by the magnet element(s) and reaches a position 196, the sensor 190 may detect the position 196 of the ball 27 and relay a signal to an output device, for example. Alternatively, any of a variety of sensors may be provided along a valve chamber 184 that does not have magnet element(s). In either case, a variety of sensors could detect and relay a signal indicating a relative flow based on a position of the ball 27 in the valve chamber 184. In particular, a sensor 193 may be provided at a first end of the chamber 184 to detect and relay a signal when the ball reaches a position 199 corresponding to a seated, sealed position resulting from breakage and high flow of fluid from a line downstream from the flow control valve 169.

Figure 4:
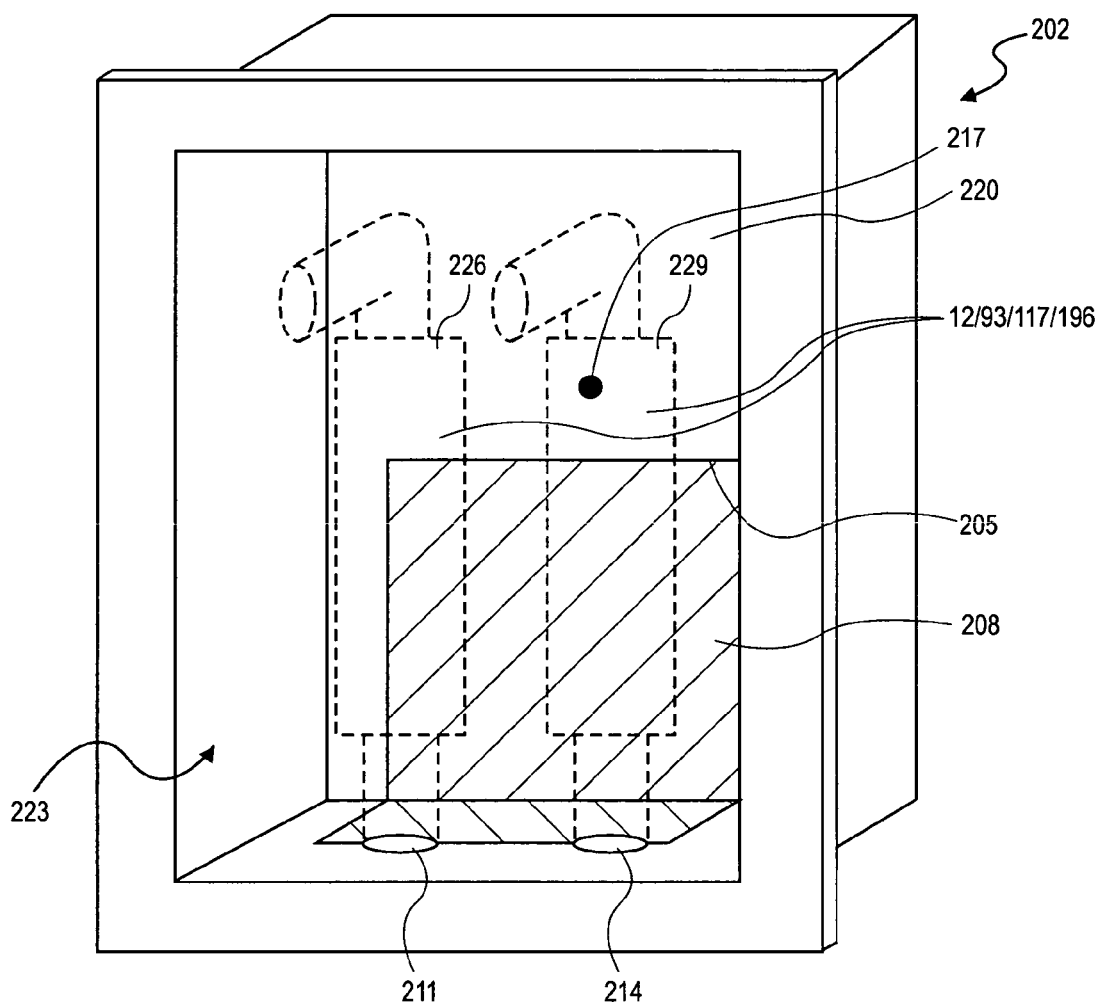
FIG. 4 is a perspective view of a flow control system including a housing for installation in a wall or cabinet and that may have one or more flow control valves integrally or removably connected therewith.

As shown in FIG. 4, a wall or cabinet mounted box 202 may advantageously have one or more flow control valves 12/93/117/196 disposed therein. The flow control valves may have any of a variety of connectors attached thereto as has been described above. The flow control valves and adapters may be inserted into the box 202 through an opening 205 that may be closed by a panel 208. The panel 208 may be closed before and/or after placement of one or more of the flow control valves 12/93/117/196 in the box 202. The opening 205 may be considered to provide a general inlet to fluid entering the flow control valves via adapters and/or upstream supply lines connected to the flow control valves 12/93/117/196. Cutouts 211 and 214 may be provided to enable adapters and/or upstream lines to extend into the box 202 with the panel 208 closed. As may be appreciated, one or more threaded fasteners 217 may pass through a back wall 220 of the box 202 for mounting the box 202 in a wall or cabinet, for example.

The flow control valves may be connected to each other and supported in the box 202 by a mechanism that will be described in greater detail below. On the other hand, the flow control valves 12/93/117/196 may be molded or otherwise integrally connected with each other and/or with the box 202. In this regard, the box and flow control valves may be provided together as an aesthetic housing that may be neatly received in a wall or cabinet, for example. In this regard, the housing may be defined as including a portion of the flow control valve immediately surrounding the valve chamber 24, 111, 184 and the box 202. As such, it is to be understood that several of the components described and shown as separable pieces could be formed together as one piece. While an open front 223 of the box 202 may be considered as a general outlet for the lines extending downstream from the flow control valves, respective outlet connections similar to those described above may provide specific outlets in first ends 226 and 229 of the flow control valves 12/93/117/196.

Figure 5A:
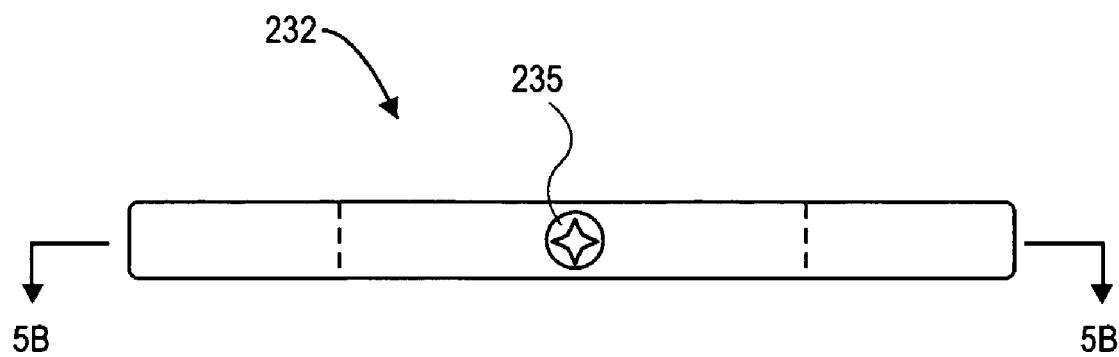
FIG. 5A is a front plan view of a yoke for connecting one or both of a pair of flow control valves together in a system for mounting.
Figure 5B:
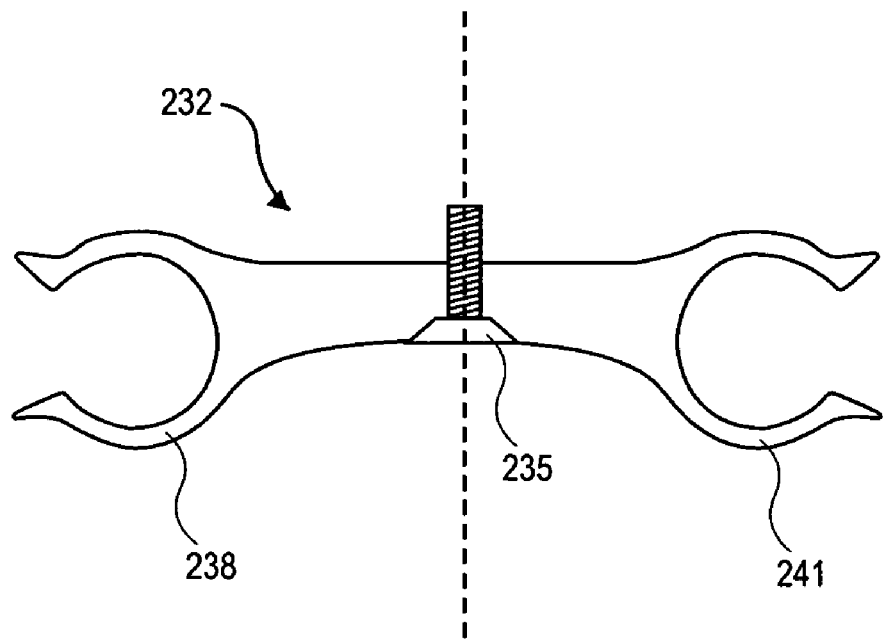
FIG. 5B is a partial sectional view taken along line 5B—5B of FIG. 5A.

FIG. 5A is a front plan view of a yoke 232 that may be used together with the box 202 of FIG. 4. When the flow control valves are not integral with the box 202, the yoke 232 may be used to interconnect the flow control valves for hot and cold water, for example. A central screw 235 may secure the yoke to the back wall 220 of the box 202. As shown in the sectional view of FIG. 5B, the yoke 232 may have respective gripping portions 238 and 241 at opposite ends thereof. These gripping portions 238 and 241 may receive the flow control valves 12/93/117/196 in a snap lock condition in the gripping portions 238 and 241. Alternatively, the yoke 232 may be part of a flow control system used separately from the box 202 and mounted to any wall to receive and support the flow control valves 12/93/117/196 and/or associated adapters and lines.

Figure 6B:
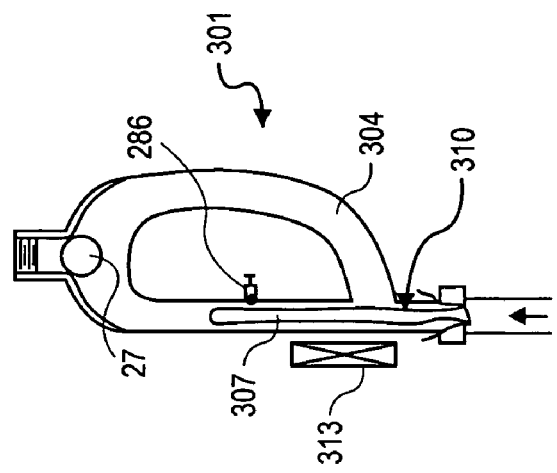
FIG. 6B is a diagrammatic sectional view of a further alternative embodiment of a flow control valve in accordance with the present invention.
Figure 6A:
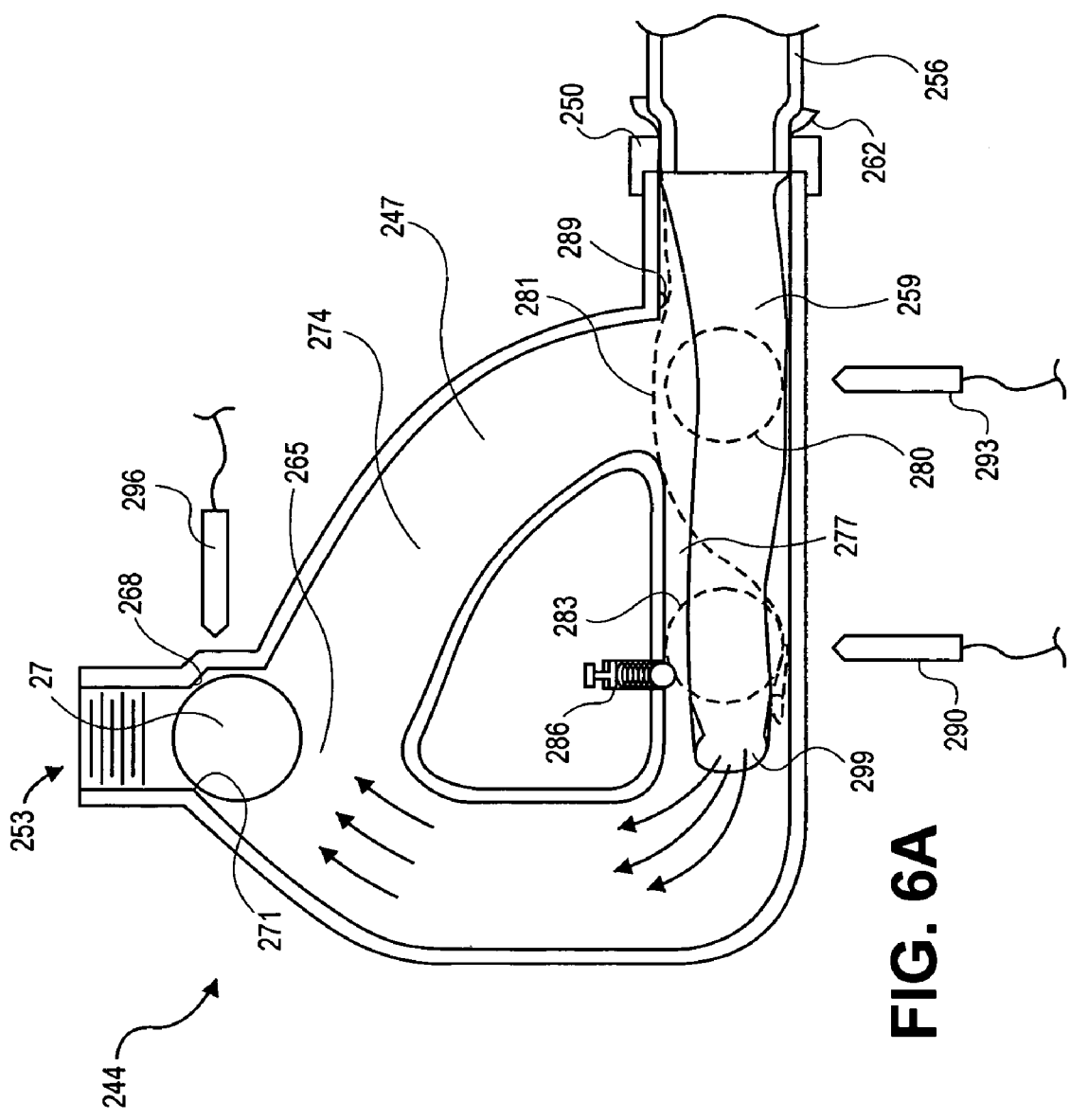
FIG. 6A is a sectional side view of an alternative embodiment of a flow control valve in accordance with the present invention.

FIG. 6A is a sectional view of a flow control valve 244 in accordance with another embodiment of the present invention. The flow control valve 244 of FIG. 6A may have a circuitous channel 247 for enabling movement of the ball 27 therein. The flow control valve 244 may include an inlet connection 250 and an outlet connection 253 for connection to upstream and downstream portions of a water line, for example. As fluid is introduced from an upstream source line 256, it moves through a flexible sleeve 259 that may be secured between the fluid source line 256 and the inlet connection 250 as shown at 262. Under normal flow conditions, the ball 27 will move into a suspension portion 265 of the flow control device 244. As with the embodiments described above, the water or other fluid in the line may flow around the sides of the ball 27 under normal flow conditions. However, in the case of a line breakage at the outlet connection 253 or downstream therefrom, the ball 27 may be carried by the increased flow to a valve chamber end wall 268 where the ball 27 sealingly engages an annular valve seat 271. In this way, the flow control valve 244 stops the flow and protects against waste and damage as described above.

After breakage or after normal flow conditions, a valve upstream from the flow control valve may be shut off. Once fluid flow has been shut off at the upstream source, the ball 27 will fall under the influence of gravity to a chute portion 274 of the circuitous channel 247 of the flow control valve 244. The ball 27 will continue to move along the chute 274 to a position resting upon the flexible sleeve 259 in a horizontal portion 277 of the circuitous channel 247. In this position of rest, the ball 27 lies at a position 280 that closes off the flexible sleeve 259 under the weight of the ball 27. The ball 27 will remain in this position until fluid from the source line 256 flows into the flexible sleeve 259. When fluid fills the flexible sleeve 259, it generally creates a filled bladder 281, which moves the ball 27 along the horizontal portion 277. Flow of fluid into the sleeve 259 will thus move the ball 27 in a direction to the left as viewed in FIG. 6A until it reaches a position 283 at which an adjustable spring stopper 286 stops the ball 27 when the ball 27 and fluid pushing the ball carry little or no momentum. This situation will occur when there is a slow leak downstream of the flow control valve 244, for example. On the other hand, a normal flow or an excessive flow will move the ball 27 rapidly along the horizontal portion 277 of the circuitous channel 247 and cause the ball 27 to overcome the spring bias of the adjustable spring mechanism 286. The ball 27 will thus pass by the restriction formed by the adjustable spring mechanism 286 through the circuitous channel 247 and into the suspension portion 265 of the flow control valve 244. As may be appreciated, the ball 27 may cycle as many times as the fluid is turned on and off.

As shown, a second restriction is provided by a protrusion 289 that prevents the ball 27 from moving out of the valve chamber that generally corresponds to the circuitous channel 247. Alternatively, a restriction could be provided at the upstream and of the flow control valve 244 by a second piece similar to those shown and described with regard to FIGS. 1A through 1C above.

The flow control valve 244 of FIG. 6A may further include sensors 290, 293, and 296. These sensors 290, 293, and 296 may be proximity sensors, for example, that detect a presence of the ball 27 at a particular location and relay a signal accordingly to an output device. Such sensors may be advantageously located at positions along the horizontal portion 277 of the circuitous channel 247 in order to detect and indicate a movement of the ball 27 due to small leaks downstream. It is to be understood that the fit of the ball 27 in the horizontal portion 27 of the circuitous channel 247 is such that fluid is inhibited from exiting through an end 299 of the flexible sleeve 259. Therefore, when there is even a small leak downstream, the flow of fluid into the flow control valve will result in filling of the bladder 281 and a resultant force pushing the ball 27 toward the position 283. When the ball 27 is eventually pushed to and remains at the position 283 for a predetermined minimum period of time, the output device may alert the home owner or other responsible person that there appears to be a slow leak. Thus, a homeowner can be forewarned of a slow leak that may otherwise cause extensive damage and waste.

FIG. 6B is a diagrammatic sectional view of another flow control valve 301 in accordance with another embodiment of the invention. The flow control valve 301 may have a circuitous channel 304 and a flexible sleeve 307 analogous to the flexible sleeve 259 and circuitous channel 247 of the flow control valve of FIG. 6A. The flow control valve 301 of FIG. 6B may have an adjustable spring mechanism 286 similar to that described with regard to FIG. 6A above. The embodiment of the flow control valve 301 shown in FIG. 6B may differ from the flow control valve 244 in that the flow control valve 301 may have a more vertically elongate configuration for mounting in spaces that are not very wide or deep. For example, the flow control valve 301 of FIG. 6B may be provided in size and shape to be more easily received in a box 202 of FIG. 4. On the other hand, the box 202 may be shaped and sized to accommodate flow control valves of any shape and size. A pair of flow control valves 244/301 could be provided in lieu of those shown in FIG. 4. The flow control valve 301 of FIG. 6B may have a restriction provided by a protrusion 310 similar to the protrusion 289 in FIG. 6A. Alternatively the protrusion could be replaced by a second piece similar to those shown and described with regard to FIGS. 1A–1C. The flow control valve 301 of FIG. 6B may also include one or more magnets 313 in order to urge the ball 27 into sealing engagement with the flexible sleeve 307 along all or part of its length.

It is to be understood that the fluid flow control valves and systems of the present invention may be applied to any of a variety of interior applications including, but not limited to, washing machines, dishwashers, faucets, and refrigerator water and/or ice supply lines. The fluid flow control valves and systems of the present invention may also be advantageously incorporated in other interior or exterior systems including automatic fill systems for Jacuzzis or swimming pools, for example. Additionally, it is to be understood that while the present invention has been described in terms of flow control valves and systems for water lines, the flow control valves and systems could be advantageously used in any of a variety of other applications including piping systems for fluids other than water. For example, the present invention may be incorporated in systems carrying solvents or fuels, including gasoline, jet fuel, and diesel fuel. The flow control valves of the present invention may thus advantageously provide a safety mechanism in fuel systems of planes and helicopters. The flow control valves of the present invention may be applied in fluid systems carrying solvents, fuels, or oils in manufacturing, processing, or packaging plants. The flow control valves may be applied in systems carrying liquid acids, such as are used in the semi-conductor industry.

The positive stop of fluid flow is a function of the flexibility of material disposed either on an exterior of a core of the ball 27 or a material disposed on the valve seats. It is to be understood that this material may have special flexibility characteristics in which the material will flex and form a positive seal with mating structure. Furthermore, this material may be selected to provide flexibility at all temperatures within the range of temperatures for the fluid phase of the fluid in the lines of a particular system. For example, in water systems at normal atmospheric pressure, a material that remains flexible at temperatures in a range from approximately 32 degrees F. to approximately 212 degrees F. may advantageously be selected. The material may by provided to remain flexible under other pressure conditions, including higher or lower pressure conditions within the system. Furthermore, the material may be selected to remain flexible in applications in which the material will be exposed to other temperature ranges particular to those applications. For example, in applications involving solvents or fuels, the material may need to have flexibility characteristics at much lower or much higher temperatures. The material may also be selected to be resistant to deterioration when exposed to the particular fluid in the system.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, while the box 202 has been shown and described as having a generally rectilinear structure, it is to be understood that the box could be of any shape including, but not limited to round, oval, hexagonal, or triangular, and may be deep or shallow. In this regard, the box may be termed a housing. Similarly, the yoke 232 may be provided in any shape or size without departing from the spirit and scope of the invention.

The invention claimed is:

1. A flow control valve, comprising:
    a valve housing including a valve chamber;
    the valve chamber having a channel with a first inner diameter;
    the valve housing including first and second restrictive ends of the valve chamber forming first and second valve seats, the restrictive ends formed by openings having restrictive dimensions at opposite downstream and upstream positions of the chamber, respectively;
    the valve housing formed of a first elongate part comprising one of the restrictive ends and substantially all structure forming the first inner diameter, a second part having a length shorter than the first elongate part, the second part comprising the other of the restrictive ends;
    a ball having a second diameter substantially smaller than the first diameter and larger than the restrictive dimensions, the ball being held in the valve chamber by the first and second restrictive ends, wherein the downstream restrictive end comprises an annular valve seat at the first end;
    an internal seam between the first and second parts at one of the first and second ends, the seam forming a connection between the first and second parts of the valve housing, wherein the seam forms an intersection between the first and second parts;
    the intersection of the first and second parts being at a location on the first part adjoining the channel, the channel having the first inner diameter at the location, the intersection extending radially away from the channel and forming a step that has a smooth inner surface having a third inner diameter greater than the first inner diameter; and
    the second part having a smooth outer surface complimentary to the third inner diameter, the smooth outer surface axially received in the first part and forming the intersection, the intersection of the first and second parts being at a location on the second part radially overlying one of the restrictive ends of the valve housing.

2. The flow control valve of claim 1, wherein one of the parts is a valve seat fitting that is slidably received into the other of the parts.

3. The flow control valve of claim 2, wherein the valve seat fitting comprises integral male threads.

4. The flow control valve of claim 2, wherein the valve seat fitting comprises integral female threads.

5. The flow control valve of claim 2, wherein the valve seat fitting comprises an elbow.

6. The flow control valve of claim 1, wherein the housing has a magnet adjustably supported thereon.

7. The flow control valve of claim 1, further comprising one or more sensors operatively connected to the housing.

8. The flow control valve of claim 1, further comprising a restriction fluidly connected to an interior of the valve.

9. The flow control valve of claim 1, wherein the valve housing comprises structure forming the valve chamber as a circuitous loop.

10. The flow control valve of claim 9, further comprising a sleeve of flexible material disposed at least partially within the housing.

11. A flow control valve, comprising:
    a valve housing including a valve chamber;
    the valve chamber having a channel with a first inner diameter;
    the valve housing including first and second restrictive ends of the valve chamber forming first and second valve seats, the restrictive ends formed by openings having restrictive dimensions at opposite downstream and upstream positions of the chamber, respectively;
    a ball having a second diameter substantially smaller than the first diameter and larger than the restrictive dimensions, the ball being held in the valve chamber by the first and second restrictive ends;
    wherein:
        the downstream restrictive end comprises an annular valve seat at the first end;
        the valve housing comprises a first part and a second part; and
        an internal seam between the first and second parts at one of the first and second ends, the seam forming a connection between the first and second parts of the valve housing, wherein the seam forms an intersection between the first and second parts; and
        the second part has a smooth outer surface complimentary to a third inner diameter on the first part, the smooth outer surface axially received in the first part and forming the intersection, the intersection of the first and second parts being at a location on the second part radially overlying one of the restrictive ends of the valve chamber.

12. The flow control valve of claim 11, wherein:
    the first part is an elongate part, the valve housing being formed of the elongate part, the elongate part comprising one of the restrictive ends and substantially all structure forming the first inner diameter, the second part has a length shorter than the first elongate part, the second part comprising the other of the restrictive ends.

13. The flow control valve of claim 11, wherein the intersection of the first and second parts is at a location on the first part that adjoins the channel at a location in which the channel has the first inner diameter and the intersection extends away from the channel and forms a smooth inner surface having a third inner diameter greater than the first inner diameter.

14. The flow control valve of claim 13, wherein the second part has a smooth outer surface complimentary to the third inner diameter, the smooth outer surface axially received in the first part and forming the intersection, the intersection of the first and second parts being at a location on the second part radially overlying one of the restrictive ends of the valve housing.

* * * * *